United States Patent
Gaal et al.

(10) Patent No.: US 12,396,018 B2
(45) Date of Patent: Aug. 19, 2025

(54) ASYMMETRIC TIME DIVISION DUPLEXING COEXISTENCE TECHNIQUES

(71) Applicant: QUALCOMM Incorporated, San Diego, CA (US)

(72) Inventors: Peter Gaal, San Diego, CA (US); Marco Papaleo, Bologna (IT); Valentin Alexandru Gheorghiu, Yokohama (JP)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 17/225,922

(22) Filed: Apr. 8, 2021

(65) Prior Publication Data

US 2021/0321416 A1 Oct. 14, 2021

Related U.S. Application Data

(60) Provisional application No. 63/007,801, filed on Apr. 9, 2020.

(51) Int. Cl.
*H04W 72/541* (2023.01)
*H04L 5/14* (2006.01)
(Continued)

(52) U.S. Cl.
CPC ............. *H04W 72/541* (2023.01); *H04L 5/14* (2013.01); *H04W 72/0446* (2013.01); *H04W 72/1215* (2013.01)

(58) Field of Classification Search
CPC ........... H04W 72/082; H04W 72/0446; H04W 72/1215; H04W 72/046; H04L 5/14; H04L 5/0005; H04L 5/0073; H04L 5/1469
See application file for complete search history.

(56) References Cited

U.S. PATENT DOCUMENTS

| 10,129,859 B2 | 11/2018 | Chen et al. |
| 2013/0272173 A1* | 10/2013 | Niu ............... H04W 72/0446 370/280 |

(Continued)

FOREIGN PATENT DOCUMENTS

| CN | 103843420 A | 6/2014 |
| WO | WO-2017065876 A1 | 4/2017 |

OTHER PUBLICATIONS

International Search Report and Written Opinion—PCT/US2021/026600—ISA/EPO—Jul. 29, 2021.

(Continued)

*Primary Examiner* — Chirag G Shah
*Assistant Examiner* — Joshua Smith
(74) *Attorney, Agent, or Firm* — Holland & Hart LLP

(57) ABSTRACT

Methods, systems, and devices for wireless communications are described. that support asymmetric time division duplexing (TDD) coexistence among different operators having adjacent nodes in wireless networks. A baseline TDD configuration may be established for a set of frequency bands, that provides that uplink (UL) transmissions and downlink (DL) transmissions within a set of frequency bands are aligned and result in relatively little or no interference among different operators. An operator may determine that a TDD configuration that is different from the baseline TDD configuration may be beneficial and may select an interference mitigation procedure and communicate with one or more UEs using the interference mitigation procedure and TDD configuration that is different than the baseline TDD configuration.

25 Claims, 11 Drawing Sheets

(51) Int. Cl.
  *H04W 72/0446* (2023.01)
  *H04W 72/12* (2023.01)

(56) References Cited

U.S. PATENT DOCUMENTS

| | | | | |
|---|---|---|---|---|
| 2014/0003270 | A1* | 1/2014 | Maltsev | H04L 5/001 |
| | | | | 370/252 |
| 2014/0177485 | A1* | 6/2014 | Wang | H04W 52/243 |
| | | | | 370/280 |
| 2014/0301256 | A1* | 10/2014 | Yao | H04L 5/0091 |
| | | | | 370/280 |
| 2014/0334352 | A1* | 11/2014 | Hu | H04W 72/20 |
| | | | | 370/280 |
| 2016/0006529 | A1* | 1/2016 | Yi | H04L 5/0044 |
| | | | | 370/329 |
| 2016/0056907 | A1* | 2/2016 | Wei | H04W 72/54 |
| | | | | 370/280 |
| 2016/0066288 | A1* | 3/2016 | Feng | H04L 5/1469 |
| | | | | 370/280 |
| 2016/0081111 | A1* | 3/2016 | Yi | H04W 72/23 |
| | | | | 370/336 |
| 2016/0149687 | A1* | 5/2016 | Lei | H04W 72/541 |
| | | | | 370/280 |
| 2016/0205680 | A1* | 7/2016 | Nguyen | H04W 72/0446 |
| | | | | 370/280 |
| 2016/0309453 | A1* | 10/2016 | Quan | H04W 72/0446 |
| 2016/0323089 | A1 | 11/2016 | Hirsch et al. | |
| 2016/0330729 | A1* | 11/2016 | Wei | H04W 72/082 |
| 2016/0381587 | A1* | 12/2016 | Alexey | H04W 72/0446 |
| | | | | 370/329 |
| 2017/0150460 | A1* | 5/2017 | Mackenzie | H04W 72/0446 |
| 2017/0310447 | A1* | 10/2017 | Kusashima | H04W 72/04 |
| 2017/0339588 | A1* | 11/2017 | Moon | H04L 5/14 |
| 2018/0167122 | A1* | 6/2018 | Gao | H04L 5/1469 |
| 2018/0279334 | A1* | 9/2018 | Lim | H04W 72/082 |
| 2019/0069288 | A1* | 2/2019 | Chen | H04W 72/21 |
| 2019/0124680 | A1 | 4/2019 | Li et al. | |
| 2019/0372740 | A1* | 12/2019 | Seol | H04L 5/14 |
| 2020/0008087 | A1 | 1/2020 | Papaleo et al. | |
| 2021/0328746 | A1* | 10/2021 | Sandberg | H04W 72/0446 |

OTHER PUBLICATIONS

Qualcomm Incorporated: "Discussion of Response LS to CEPT", 3GPP Draft, 3GPP TSG RAN Meeting 80, RP-180675, Discussion of Response LS to CEPT, 3rd Generation Partnership Project (3GPP), Mobile Competence Centre, 650, Route Des Lucioles, F-06921 Sophia-Antipolis Cedex, France, vol. TSG RAN, No. La Jolla, CA, U.S.A, Jun. 11, 2018-Jun. 14, 2018, Jun. 7, 2018 (Jun. 7, 2018), XP051509984, 6 Pages, Retrieved from the Internet: URL: http://www.3gpp.org/ftp/tsg%5Fran/TSG%5FRAN/TSGR%5F80/Docs/RP%2D180675%2Ezip. [Retrieved on Jun. 7, 2018] sections 2 to 2.3.

Qualcomm Incorporated: "Discussion of Response LS to CEPT", 3GPP TSG RAN Meeting 80, RP-180675, La Jolla, CA, U.S.A., Jun. 11, 2018-Jun. 14, 2018, Jun. 17, 2018, pp. 1-6, Section 1-2.

\* cited by examiner

ASYMMETRIC TIME DIVISION DUPLEXING COEXISTENCE TECHNIQUES

CROSS REFERENCE

The present application for patent claims the benefit of U.S. Provisional Patent Application No. 63/007,801 by Gaal et al., entitled "ASYMMETRIC TIME DIVISION DUPLEXING COEXISTENCE TECHNIQUES," filed Apr. 9, 2020, assigned to the assignee hereof, and expressly incorporated by reference herein.

BACKGROUND

The following relates generally to wireless communications, and more specifically to asymmetric time division duplexing (TDD) coexistence techniques.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some systems, different operators (e.g., different Mobile Network Operators (MNOs)) may have base stations and UEs that are interspersed, such that base stations of one operator may be adjacent to one or more base stations of another operator. Each operator, in some deployments, may use operating frequencies that are different such that concurrent transmissions of different operators may not cause significant interference with other operators. However, in some frequency bands and deployments, operators may have overlapping coverage areas in which transmissions of a base station or a UE of a first operator may interfere with transmissions of a second operator. In such cases, techniques for mitigating such interference may be desirable to enhance coexistence of the different operators while providing reliable communications for each operator.

SUMMARY

The described techniques relate to improved methods, systems, devices, and apparatuses that support asymmetric time division duplexing (TDD) coexistence techniques. Various described techniques provide for enhanced coexistence of different operators using TDD communications in a set of frequency bands in which transmissions of a first frequency band may cause interference in a second frequency band. In some cases, a baseline TDD configuration may be established for the set of frequency bands. The baseline TDD configuration may provide that uplink (UL) transmissions and downlink (DL) transmissions within the set of frequency bands are aligned and result in relatively little or no interference among different operators. In some cases, an operator may determine that a TDD configuration that is different from the baseline TDD configuration may be beneficial (e.g., a TDD configuration that provides more DL slots when DL-heavy data traffic is present for served UEs). In such cases, the operator may select an interference mitigation procedure (e.g., using beamformed transmissions, power reductions, other interference mitigation techniques, or combinations thereof) and communicate with one or more UEs using the interference mitigation procedure and TDD configuration that is different than the baseline TDD configuration.

In some cases, the baseline TDD configuration includes a first set of DL slots configured for DL transmissions and a second set of UL slots configured for UL transmissions, and the interference mitigation procedure is only selected when the identified TDD configuration has one or more DL slots that overlap with the second set of UL slots of the baseline TDD configuration. In cases where an operator uses the baseline TDD configuration or a different configuration in which DL slots are non-overlapping with the second set of UL slots is used for communications, the base stations and UEs may communicate without using the interference mitigation procedure.

A method of wireless communication is described. The method may include establishing, at a first base station, at least one wireless connection with at least one UE using TDD in a first frequency band of a set of frequency bands, where the set of frequency bands has an associated baseline TDD configuration, identifying a first TDD configuration that is different than the baseline TDD configuration for communications with the at least one UE, selecting an interference mitigation procedure based on the identified first TDD configuration, and communicating with the at least one UE using the first TDD configuration and the interference mitigation procedure.

An apparatus for wireless communication is described. The apparatus may include a processor, memory in electronic communication with the processor, and instructions stored in the memory. The instructions may be executable by the processor to cause the apparatus to establish, at a first base station, at least one wireless connection with at least one UE using TDD in a first frequency band of a set of frequency bands, where the set of frequency bands has an associated baseline TDD configuration, identify a first TDD configuration that is different than the baseline TDD configuration for communications with the at least one UE, select an interference mitigation procedure based on the identified first TDD configuration, and communicate with the at least one UE using the first TDD configuration and the interference mitigation procedure.

Another apparatus for wireless communication is described. The apparatus may include means for establishing, at a first base station, at least one wireless connection with at least one UE using TDD in a first frequency band of a set of frequency bands, where the set of frequency bands has an associated baseline TDD configuration, identifying a first TDD configuration that is different than the baseline TDD configuration for communications with the at least one UE, selecting an interference mitigation procedure based on the identified first TDD configuration, and communicating with the at least one UE using the first TDD configuration and the interference mitigation procedure.

A non-transitory computer-readable medium storing code for wireless communication is described. The code may include instructions executable by a processor to establish, at a first base station, at least one wireless connection with at least one UE using TDD in a first frequency band of a set of frequency bands, where the set of frequency bands has an associated baseline TDD configuration, identify a first TDD configuration that is different than the baseline TDD configuration for communications with the at least one UE, select an interference mitigation procedure based on the identified first TDD configuration, and communicate with the at least one UE using the first TDD configuration and the interference mitigation procedure.

In some examples of the method, apparatuses, and non-transitory computer-readable medium described herein, the baseline TDD configuration includes a first set of DL slots configured for DL transmissions and a second set of uplink (UL) slots configured for UL transmissions, and where the interference mitigation procedure may be selected when the identified TDD configuration may have one or more DL slots that overlap with the second set of UL slots of the baseline TDD configuration. In some examples of the method, apparatuses, and non-transitory computer-readable medium described herein, the interference mitigation procedure may be not selected when the identified TDD configuration may have one or more UL slots that overlap with the first set of DL slots of the baseline TDD configuration, and the identified TDD configuration may have one or more DL slots that may be non-overlapping with the second set of slots of the baseline TDD configuration.

In some examples of the method, apparatuses, and non-transitory computer-readable medium described herein, the first set of DL slots includes a first subset of DL slots that may be configurable only as DL slots and a second subset of slots that may be flexible slots which may be reconfigured to UL slots based on the selected TDD configuration, and where the second set of UL slots includes a third subset of UL slots that may be configurable only as UL slots and a fourth subset of slots that may be flexible slots which may be reconfigured to DL slots based on the selected TDD configuration. Some examples of the method, apparatuses, and non-transitory computer-readable medium described herein may further include operations, features, means, or instructions for scheduling higher priority DL transmissions in the first subset of DL slots, lower priority DL transmissions in the second subset of slots, higher priority UL transmissions in the third subset of UL slots, and lower priority UL transmissions in the fourth subset of slots. In some examples of the method, apparatuses, and non-transitory computer-readable medium described herein, the higher priority DL transmissions include DL synchronization signals, DL broadcast transmissions, or combinations thereof, and the higher priority UL transmissions include, UL control signals, UL random access channel transmissions, or combinations thereof.

Some examples of the method, apparatuses, and non-transitory computer-readable medium described herein may further include operations, features, means, or instructions for selecting, after the communicating using the first TDD configuration, the baseline TDD configuration for further communications with the at least one UE, discontinuing the interference mitigation procedure based on the selecting the baseline TDD configuration and communicating with the at least one UE using the baseline TDD configuration. In some examples of the method, apparatuses, and non-transitory computer-readable medium described herein, the first base station may be associated with a first operator of a first wireless communications network and one or more adjacent base stations to the first base station may be associated with a second operator of a second wireless communications network, and where the second operator uses a TDD configuration that may be different than the first TDD configuration.

In some examples of the method, apparatuses, and non-transitory computer-readable medium described herein, the interference mitigation procedure provides that, for transmissions of the first operator during TDD slots of the first TDD configuration that may have a different duplex direction than corresponding TDD slots of the baseline TDD configuration, an interference level at the one or more adjacent base stations or one or more UEs associated with the second operator may be below a threshold value.

In some examples of the method, apparatuses, and non-transitory computer-readable medium described herein, the interference mitigation procedure includes one or more of active antenna system (AAS) beamforming of downlink transmission beams, reducing transmit power or power spectral density of downlink transmissions, pulse shaping of downlink transmissions, predistortion filtering, or any combinations thereof. In some examples of the method, apparatuses, and non-transitory computer-readable medium described herein, the AAS beamforming includes FD-MIMO beamforming. In some examples of the method, apparatuses, and non-transitory computer-readable medium described herein, the identifying the first TDD configuration may be performed dynamically or semi-statically.

DETAILED DESCRIPTION

Figure 1:
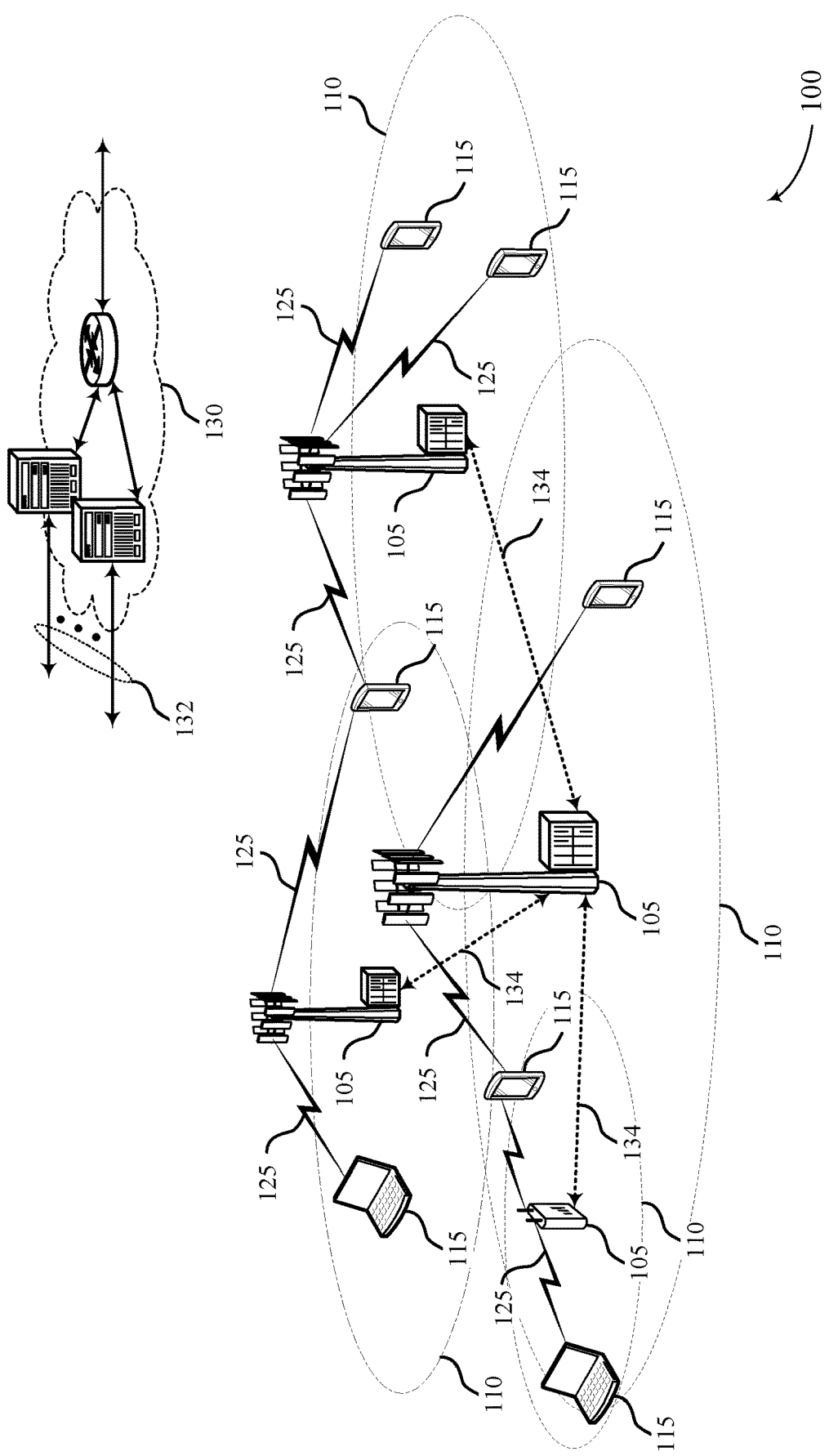
FIG. 1 illustrates an example of a system for wireless communications that supports asymmetric time division duplexing coexistence techniques in accordance with aspects of the present disclosure.

Various aspects of the present disclosure provide techniques for enhanced coexistence of different operators using time division duplexing (TDD) communications. In some cases, the different operators may use frequency bands in a set of frequency bands, and transmissions of a first frequency band may cause interference in a second frequency band. In some cases, a baseline TDD configuration may be established for the set of frequency bands. The baseline TDD configuration may provide that uplink (UL) transmissions and downlink (DL) transmissions within the set of frequency bands are aligned and result in relatively little or no interference among different operators.

In some cases, a first operator using a first frequency band may identify that a first TDD configuration that is different from the baseline TDD configuration may be beneficial for communications with one or more UEs. For example, the one or more UEs may have services or data traffic that use relatively heavy DL or UL transmissions, and the first TDD configuration may have more DL or UL slots than the baseline TDD configuration, and may thus provide more efficient communications. The first operator may also, in some cases, select an interference mitigation procedure based on the identification of the first TDD configuration. Such an interference mitigation procedure (e.g., using beamformed transmissions, power reductions, other interference mitigation techniques, or combinations thereof) may reduce potential interference with base stations or UEs of a second operator that may have one or more base stations adjacent to base stations of the first operator. The first operator may communicate with one or more UEs using the first TDD configuration and the interference mitigation procedure.

In some cases, the baseline TDD configuration includes a first set of DL slots configured for DL transmissions and a second set of UL slots configured for UL transmissions, and the interference mitigation procedure is only selected when the identified TDD configuration has one or more DL slots that overlap with the second set of UL slots of the baseline TDD configuration. In cases where an operator uses the baseline TDD configuration or a different configuration in which DL slots are non-overlapping with the second set of UL slots, the base stations and UEs may communicate without using the interference mitigation procedure.

In some cases, the baseline TDD configuration may include a number of fixed DL slots, a number of fixed UL slots, and a number of flexible slots. In such cases, the fixed DL slots and fixed UL slots may always be used for DL and UL transmissions, respectively, and the potential for interference in such slots may be relatively low. The flexible slots may, in some cases, be changed from DL slots to UL slots, or vice versa, which may result in increased potential for interference for such changed slots, which may be mitigated by the selected interference mitigation procedure. In some cases, more sensitive transmissions (e.g., DL synchronization signals, DL broadcast transmissions, UL control signals, UL random access channel transmissions, etc.) may be transmitted in the fixed direction slots, and less sensitive transmission (e.g., DL shared channel transmissions, UL shared channel transmissions) may be transmitted in the flexible slots.

Such techniques may allow operators enhanced flexibility for communications in their wireless communications networks. Further, in cases where an operator may not have capability for performing interference mitigation (e.g., certain LTE or 4G networks may not support beamforming), the operator may use the baseline TDD configuration or TDD configurations in which UL slots of the baseline TDD configuration are not used for DL transmissions, and may thus avoid having to perform interference mitigation. Other operators (e.g., operators of 5G of NR networks that use the set of frequency bands) may elect to perform interference mitigation and have increased flexibility to select various different TDD configurations that may provide more efficient communications.

Aspects of the disclosure are initially described in the context of a wireless communications system. Various examples of TDD configurations are then discussed. Aspects of the disclosure are further illustrated by and described with reference to apparatus diagrams, system diagrams, and flowcharts that relate to asymmetric TDD coexistence techniques.

FIG. 1 illustrates an example of a wireless communications system 100 that supports asymmetric TDD coexistence techniques in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, wireless communications system 100 may use TDD communications in which a baseline TDD configuration may be established and a different TDD configuration may be selected for communications between UEs 115 and base stations 105.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), TDD (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105. When referring to TDD slots herein, reference is made to a unit of scheduling in which uplink or downlink transmissions may be transmitted, which in some cases may be a subframe, slot, mini-slot, combinations thereof, or any unit of time associated with TDD uplink or downlink transmissions that is used to define a TDD configuration.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

As indicated above, in some cases wireless communications system 100 may be operated by a first operator and may use TDD for communications between UEs 115 and base stations 105. In some cases, a baseline TDD configuration may be established for a set of frequency bands, and the baseline TDD configuration may provide that UL transmissions and DL transmissions within the set of frequency bands are aligned and result in relatively little or no interference among nodes of wireless communications system 100 and wireless nodes of a different operators that may be adjacent to one or more UEs 115 or base stations 105. In some cases, the first operator may identify that a first TDD configuration, that is different from the baseline TDD configuration, may be beneficial for communications with one or more UEs 115. The first operator may also, in some cases, select an interference mitigation procedure based on the identification of the first TDD configuration. Such an interference mitigation procedure (e.g., using beamformed transmissions, power reductions, other interference mitigation techniques, or combinations thereof) may reduce potential interference with nodes of the one or more different operators. The first operator may communicate with one or more UEs 115 using the first TDD configuration and the interference mitigation procedure.

Figure 2:
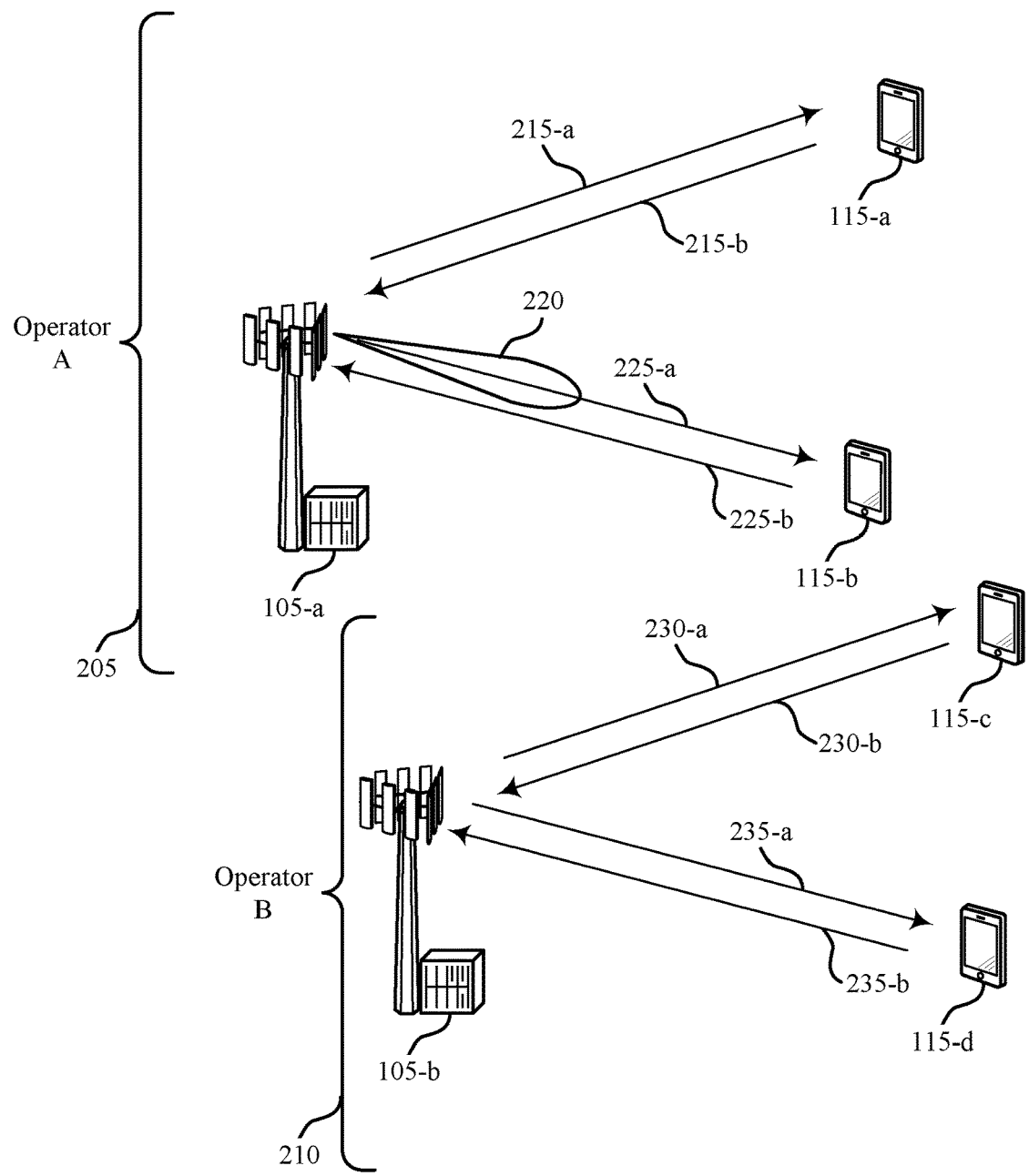
FIG. 2 illustrates an example of a portion of a wireless communications system that supports asymmetric TDD coexistence techniques in accordance with aspects of the present disclosure.

FIG. 2 illustrates an example of a wireless communications system 200 that supports asymmetric TDD coexistence techniques in accordance with aspects of the present disclosure. In some examples, wireless communications system 200 may implement aspects of wireless communications system 100. Wireless communications system 200 may include a first base station 105-a, a first UE 115-a, and a second UE 115-b, that are each associated with a first operator (operator A) 205. Wireless communications system 200 may also include a second base station 105-b, a third UE 115-c, and a fourth UE 115-d, that are each associated with a second operator (operator B) 210. The base stations 105 and UEs may be examples of the corresponding devices described with reference to FIG. 1. In this example, the first operator 205 and the second operator 210 may each operate using TDD communications in a set of frequency bands that may have a baseline TDD configuration.

As indicated above, various aspects of the present disclosure provide techniques for coexistence of multiple carriers that may use different, or asymmetric, TDD configurations. In some examples, the first base station 105-*a* may communicate with the first UE 115-*a* via downlink transmissions 215-*a* and uplink transmissions 215-*b*, and the first base station 105-*a* may communicate with the second UE 115-*b* via downlink transmissions 225-*a* and uplink transmissions 225-*b*. In some cases, the first base station 105-*a* may use beamformed transmissions 220 for communications with one or more UEs 115. Similarly, the second base station 105-*b* may communicate with the third UE 115-*c* via downlink transmissions 230-*a* and uplink transmissions 230-*b*, and the second base station 105-*b* may communicate with the fourth UE 115-*d* via downlink transmissions 235-*a* and uplink transmissions 235-*b*. While only one base station 105 and two UEs 115 are illustrated for each of the first operator 205 and the second operator 210, each operator may have numerous base stations 105 and numerous UEs 115, which may be adjacent to one another.

In some cases, the first operator 205 and the second operator 210 may operate using frequency bands of a set of frequency bands, in which transmissions of one frequency band may cause interference with transmissions of another frequency band. For example, if downlink transmission 225-*a* is transmitted concurrently with uplink transmission 230-*b*, interference may result in degradation of each of the transmitted signals. Further, in some cases downlink transmission 225-*a* may be transmitted at a significantly higher power than uplink transmission 230-*b*, which may result in significant interference with uplink transmission 230-*b*. In some cases, the interference may be significant enough that the uplink transmission 230-*b* is not received at the second base station 105-*b*. In order to provide coexistence of the first operator 205 and the second operator 210, in some cases, synchronized or semi-synchronized operation between the first operator 205 and the second operator 210 may be utilized to provide reduced interference between uplink transmissions and downlink transmissions. Synchronized operation may be provided when a TDD configuration is mandated for both the first operator 205 and the second operator 210. Semi-synchronized operation may be provided when a subset of time slots have synchronized fixed transmission directions (e.g., a first subset of slots are UL slots and a second subset of slots are DL slots), and other time slots may have different flexible transmission directions.

In some aspects of the present disclosure, coexistence between the first operator 205 and the second operator 210 may be achieved through the establishment of a baseline TDD configuration for the set of frequency bands. The baseline TDD configuration may provide that UL transmissions and DL transmissions within the set of frequency bands are aligned and result in relatively little or no interference among different operators. In some cases, the first operator 205 using the first frequency band may identify that a first TDD configuration that is different from the baseline TDD configuration may be beneficial for communications with the first UE 115-*a* and the second UE 115-*b*. For example, the first UE 115-*a* and second UE 115-*b* may be receiving relatively large amounts of DL data and transmitting relatively little UL data, and the first base station 105-*a* may determine that a TDD configuration that has more DL slots than the baseline TDD configuration would be preferable for such communications. The first operator 205 in such cases, may identify the first TDD configuration and may also, in some cases, select an interference mitigation procedure based on the identification of the first TDD configuration. Such an interference mitigation procedure may reduce potential interference with at the second base station 105-*b* or the third UE 115-*c*, for example. In some cases, the first operator 205 may only select an interference mitigation procedure when a DL slot of the baseline TDD configuration is reconfigured to be an uplink slot. Examples of semi-synchronous slot allocations, a baseline TDD configuration, and different TDD configurations, are discussed in more detail with respect to FIGS. 3 through 5.

Figure 3:
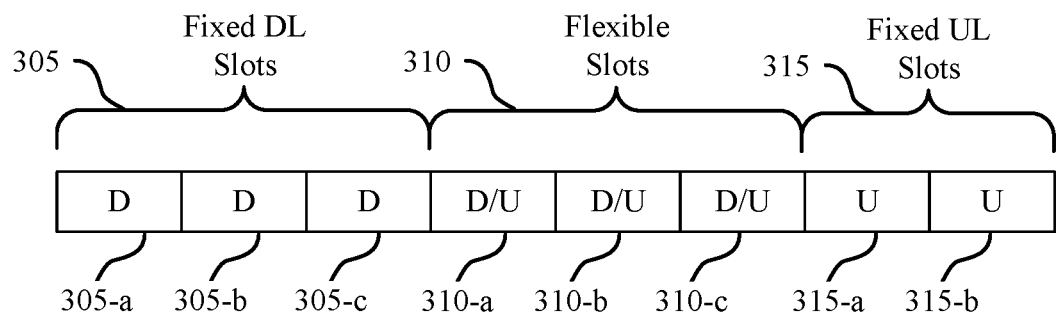
FIG. 3 illustrates an example of a flexible TDD configuration that supports asymmetric TDD coexistence techniques in accordance with aspects of the present disclosure.

FIG. 3 illustrates an example of a flexible TDD configuration 300 that supports asymmetric TDD coexistence techniques in accordance with aspects of the present disclosure. In some examples, flexible TDD configuration 300 may implement aspects of wireless communications system 100 or 200. In this example, a semi-synchronous TDD slot allocation may include a first set of fixed DL slots 305 (e.g., slots 305-*a*, 305-*b*, and 305-*c*), a second set of flexible slots 310 (e.g., slots 310-*a*, 310-*b*, and 310-*c*), and a third set of UL slots 315 (e.g., slots 315-*a*, and 315-*b*). In such cases, the first set of fixed DL slots 305 may be configurable for only downlink transmissions, and the third set of fixed UL slots 315 may be configurable for only uplink transmissions. The second set of flexible slots 310 may be configured for either UL or DL transmissions. It is noted that the number of slots illustrated in FIG. 3, as well as illustrated in FIGS. 4 and 5, are provided for purposes of illustration and discussion only, and numerous different numbers and configurations of slots may be present in a TDD configuration.

Such a semi-synchronous TDD slot allocation may allow an operator flexibility to select a number of DL or UL slots based on current or expected traffic conditions. As discussed above, however, in some cases when adjacent base stations or UEs of different operators have different TDD transmission directions for a slot, interference may result for one or both operators. For example, operators may choose to use semi-statically configured DL/UL partitioning but use different DL/UL patterns, or one or more operators may choose to use dynamic DL/UL partitioning. If unsynchronized operation were to be used, none of the slots would have a certain fixed transmission direction, and any available DL/UL pattern could be selected. In cases such as illustrated in FIG. 3, when semi-synchronized TDD slot allocations are used, the DL/UL pattern within the second set of flexible slots 310 may be semi-statically or dynamically modified, while the first set of DL slots 305 and the third set of UL slots 315 have a fixed transmission direction. Thus, the first set of DL slots 305 and the third set of UL slots 315 may be expected to experience less interference than the second set of flexible slots 310. In some cases, base stations of one or more of the operators may schedule higher priority or more sensitive information, such as DL synchronization signals, DL broadcast, UL control signals, UL PRACH resources, etc., in the first set of DL slots 305 and the third set of UL slots. Other lower priority or less sensitive information may be transmitted in the remaining flexible slots 310, which in some cases may include all other signals, including unicast data. Accordingly, such semi-synchronous TDD slot allocation may provide flexibility in scheduling and TDD configuration selection, while also providing reduced interference between different operators having adjacent base stations or UEs.

As indicated above, in some cases an operator may use one or more interference mitigation techniques in the event that one or more of the flexible slots 310 may cause interference with a node of another operator. Further, as discussed above, in some cases an operator may not desire to implement interference mitigation techniques, or may not have capability to implement interference mitigation techniques. In such cases, a single fixed TDD configuration may be mandated, which may eliminate the need for additional interference mitigation techniques at an operator, but which reduces flexibility to modify TDD configurations based on traffic characteristics. In some aspects of the current disclosure, a baseline TDD configuration may be established, and operators using the baseline configuration may not need to perform interference mitigation. In cases where an operator wants to use a different TDD configuration than the baseline TDD configuration, the operator may select a different TDD configuration and in some cases may perform interference mitigation to avoid generating interference at nodes of other operators. Thus, operators that are not able to perform interference mitigation may use the baseline TDD configuration, and operators that desire more flexibility may elect to use a different TDD configuration. In some examples, some or all of the TDD slots of the baseline TDD configuration may be changed by an operator. In other examples, the baseline TDD configuration may be a semi-synchronous TDD configuration in which some slots have a fixed duplex direction.

Figure 4:
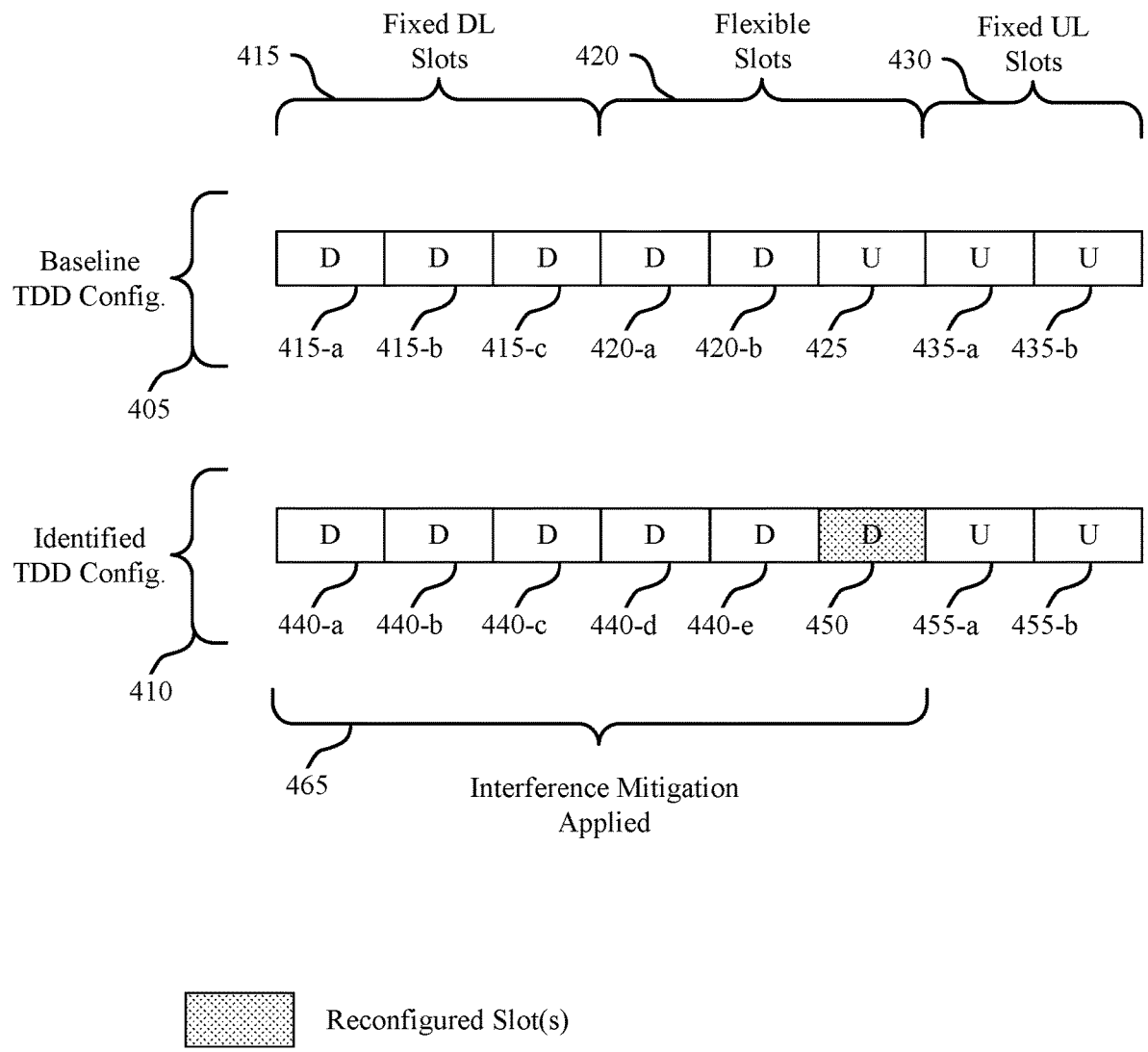
FIG. 4 illustrates an example of a baseline TDD configuration and a different TDD configuration that supports asymmetric TDD coexistence techniques in accordance with aspects of the present disclosure.
Figure 5:
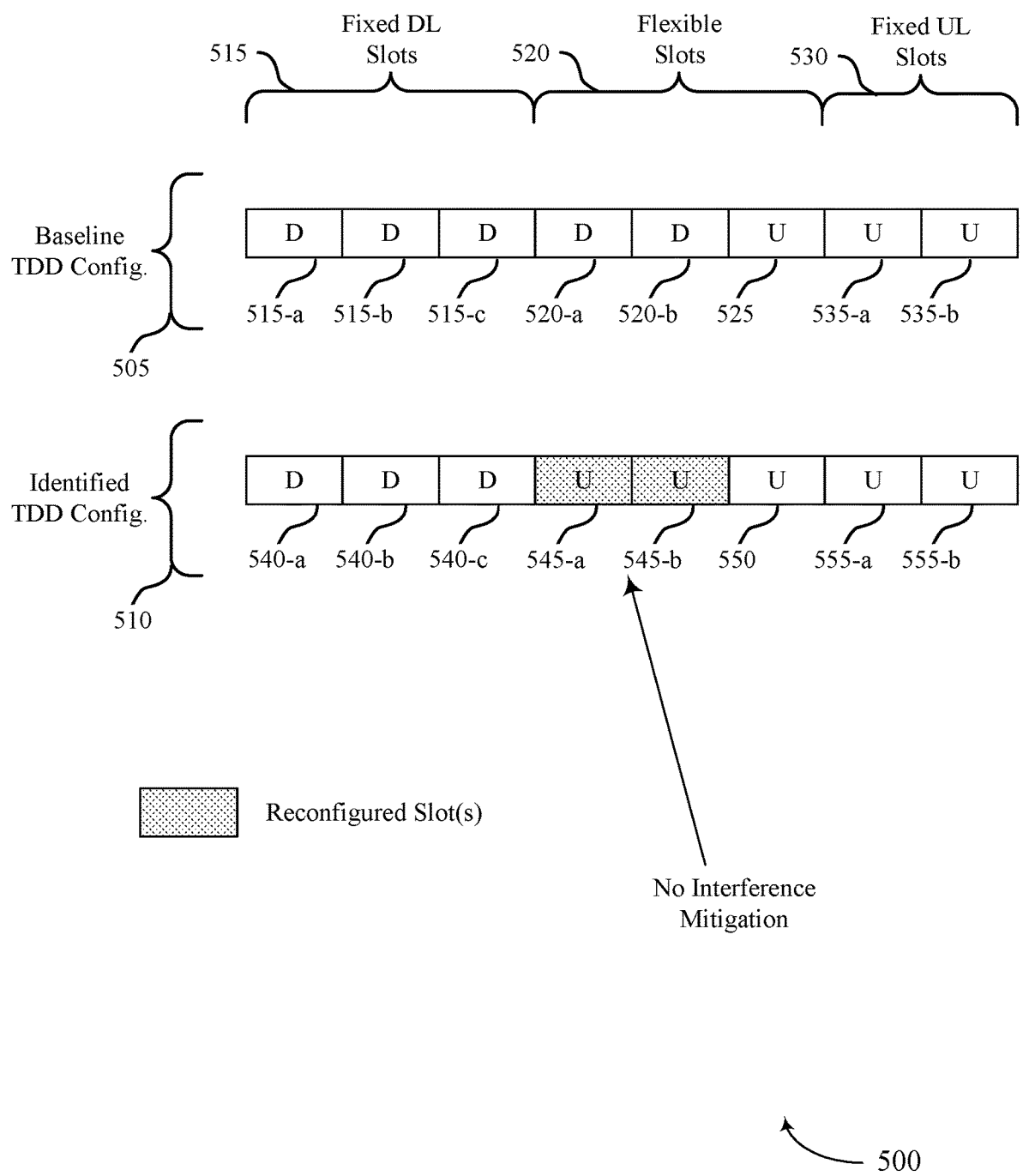
FIG. 5 illustrates an example of a baseline TDD configuration and a different TDD configuration that supports asymmetric TDD coexistence techniques in accordance with aspects of the present disclosure.

FIG. 4 illustrates an example of a baseline TDD configuration and a different TDD configuration 400 that supports asymmetric TDD coexistence techniques in accordance with aspects of the present disclosure. In some examples, baseline TDD configuration and a different TDD configuration 400 may implement aspects of wireless communications system 100 or 200. In this example, a baseline TDD configuration 405 may employ a semi-synchronous TDD configuration, and have a first set of DL slots 415, a second set of flexible slots 420, and a third set of uplink slots 430. In this example, the baseline TDD configuration 405 may include downlink slots 415-a through 415-c, as well as slots 420-a and 420-b (which may together form a first set of DL slots configured for DL transmissions of the baseline TDD configuration 405). The baseline TDD configuration 405 may also include uplink slots that include slot 425 of the flexible slots 420, and fixed uplink slots 435-a and 435-b (which may together form a second set of UL slots configured for UL transmissions of the baseline TDD configuration 405).

In some cases, as indicated above, an operator may desire to change a TDD configuration for communications between UEs and base stations of the operator. In some cases, a base station of the operator may identify a TDD configuration 410 that is different than the baseline TDD configuration 405. In this example, additional DL slots may be desired, and the uplink slot 425 may be changed to a downlink slot 450 in the identified TDD configuration, which may also include downlink slots 440-a through 440-e, and uplink slots 455-a and 455-b.

In some cases, additional interference that results from the downlink slot 450 may be mitigated through one or more interference mitigation procedures that may be performed by base stations or UEs of the operator using the identified TDD configuration 410. In some cases, interference mitigation may be applied to all of the downlink slots 465 of the identified TDD configuration 410, although in some cases interference mitigation may be applied only to the downlink slot 450 that deviates from the baseline TDD configuration 405. The interference mitigation procedures may include one or more procedures, such as one or more of active antenna system (AAS) beamforming of downlink transmission beams, reducing transmit power or power spectral density of downlink transmissions, pulse shaping of downlink transmissions, predistortion filtering, or any combinations thereof.

Thus, if an operator chooses to follow the baseline TDD configuration 405, that operator may not need to employ AAS or any interference mitigation technique. Further, in some cases, if the operator chooses not to follow the baseline TDD configuration 405 but limits operation so that DL slots of the baseline TDD configuration 405 are used for UL but not vice versa, that operator may not need to employ AAS or other interference mitigation techniques. An example of such an identified TDD configuration is illustrated in FIG. 5.

FIG. 5 illustrates an example of a baseline TDD configuration and a different TDD configuration 500 that supports asymmetric TDD coexistence techniques in accordance with aspects of the present disclosure. In some examples, baseline TDD configuration and a different TDD configuration 500 may implement aspects of wireless communications system 100 or 200. In this example, a baseline TDD configuration 505 may employ a semi-synchronous TDD configuration, and have a first set of DL slots 515, a second set of flexible slots 520, and a third set of uplink slots 530. In this example, the baseline TDD configuration 505 may include downlink slots 515-a through 515-c, as well as slots 520-a and 520-b (which may together form a first set of DL slots configured for DL transmissions of the baseline TDD configuration 505). The baseline TDD configuration 505 may also include uplink slots that include slot 525 of the flexible slots 520, and fixed uplink slots 535-a and 535-b (which may together form a second set of UL slots configured for UL transmissions of the baseline TDD configuration 505).

In this example, the operator may identify TDD configuration 510 for communications, in which the downlink slots 520-a and 520-b of the flexible slots 520 are changed to uplink slots 545-a and 545-b. As indicated above, in some cases reconfiguring DL slots of the baseline TDD configuration 505 to UL slots may not result in significant interference with other DL transmissions of other operators. For example, an uplink transmission of a UE of a first operator may not significantly interfere with a downlink transmission of a base station of a second operator, as the downlink transmission may be transmitted at a higher power and be more readily received at an associated UE of the second operator. Accordingly, in some cases, interference mitigation may not be performed in cases where DL slots of the baseline TDD configuration 505 are reconfigured to be UL slots. Thus, in this example, the identified TDD configuration 510 includes downlink slots 540-a through 540-c, and uplink slots 545-a, 545-b, as well as the uplink slots 550 and 555-a through 555-b that are in the baseline TDD configuration 505.

Again, in this example, if an operator chooses to follow the baseline TDD configuration 505, that operator may not need to employ AAS or any interference mitigation technique. Further, in some cases, if the operator chooses not to follow the baseline TDD configuration 505 but limits operation so that DL slots of the baseline TDD configuration 505 are used for UL but not vice versa, that operator may not need to employ AAS or other interference mitigation techniques. However, if the operator chooses not to follow the baseline TDD configuration 505 and uses slots that are UL in the baseline TDD configuration 505 for DL (e.g., as illustrated in FIG. 4), the operator may employ AAS or other interference mitigation technique to help ensure that an adjacent operator following the baseline TDD configuration 505 is not subject to excessive interference.

Figure 6:
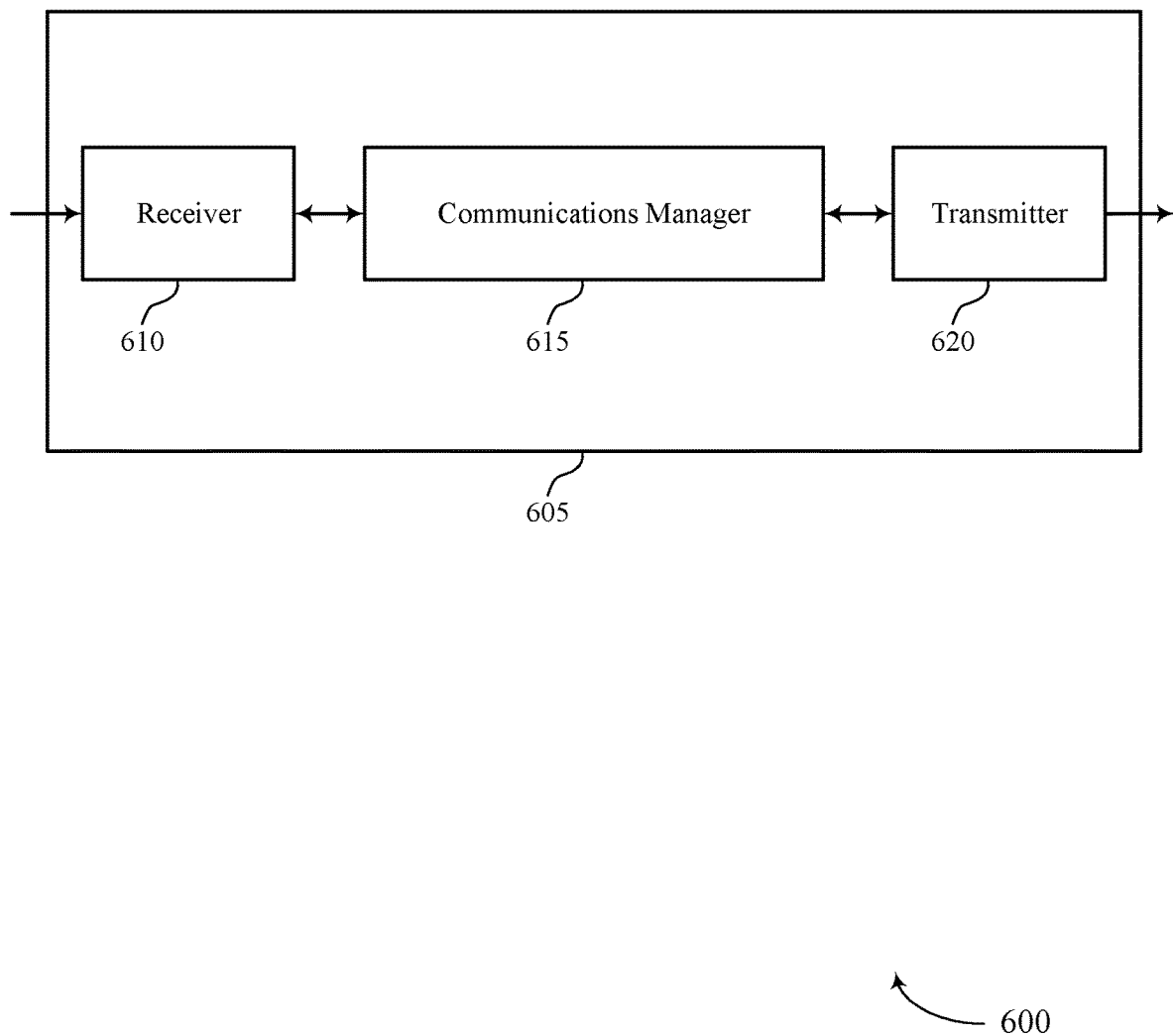
FIGS. 6 and 7 show block diagrams of devices that support asymmetric TDD coexistence techniques in accordance with aspects of the present disclosure.

FIG. 6 shows a block diagram 600 of a device 605 that supports asymmetric TDD coexistence techniques in accordance with aspects of the present disclosure. The device 605 may be an example of aspects of a base station 105 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to asymmetric TDD coexistence techniques, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may establish at least one wireless connection with at least one UE using TDD in a first frequency band of a set of frequency bands, where the set of frequency bands has an associated baseline TDD configuration, communicate with the at least one UE using the first TDD configuration and the interference mitigation procedure, identify a first TDD configuration that is different than the baseline TDD configuration for communications with the at least one UE, and select an interference mitigation procedure based on the identified first TDD configuration. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
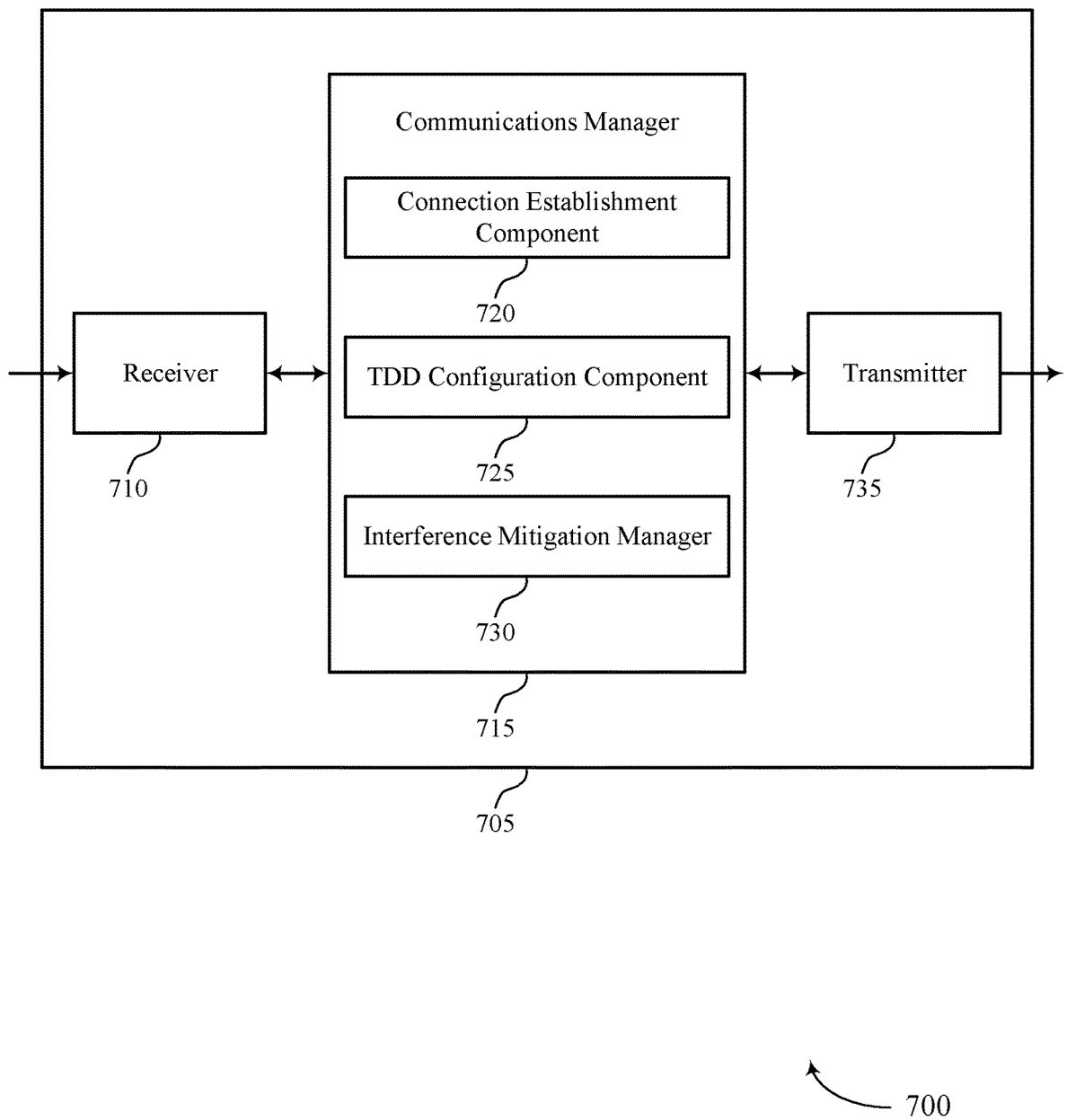

FIG. 7 shows a block diagram 700 of a device 705 that supports asymmetric TDD coexistence techniques in accordance with aspects of the present disclosure. The device 705 may be an example of aspects of a device 605 or a base station 105 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to asymmetric TDD coexistence techniques, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a connection establishment component 720, a TDD configuration component 725, and an interference mitigation manager 730. The communications manager 715 may be an example of aspects of the communications manager 910 described herein.

The connection establishment component 720 may establish at least one wireless connection with at least one UE using TDD in a first frequency band of a set of frequency bands, where the set of frequency bands has an associated baseline TDD configuration and communicate with the at least one UE using the first TDD configuration and the interference mitigation procedure.

The TDD configuration component 725 may identify a first TDD configuration that is different than the baseline TDD configuration for communications with the at least one UE.

The interference mitigation manager 730 may select an interference mitigation procedure based on the identified first TDD configuration.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
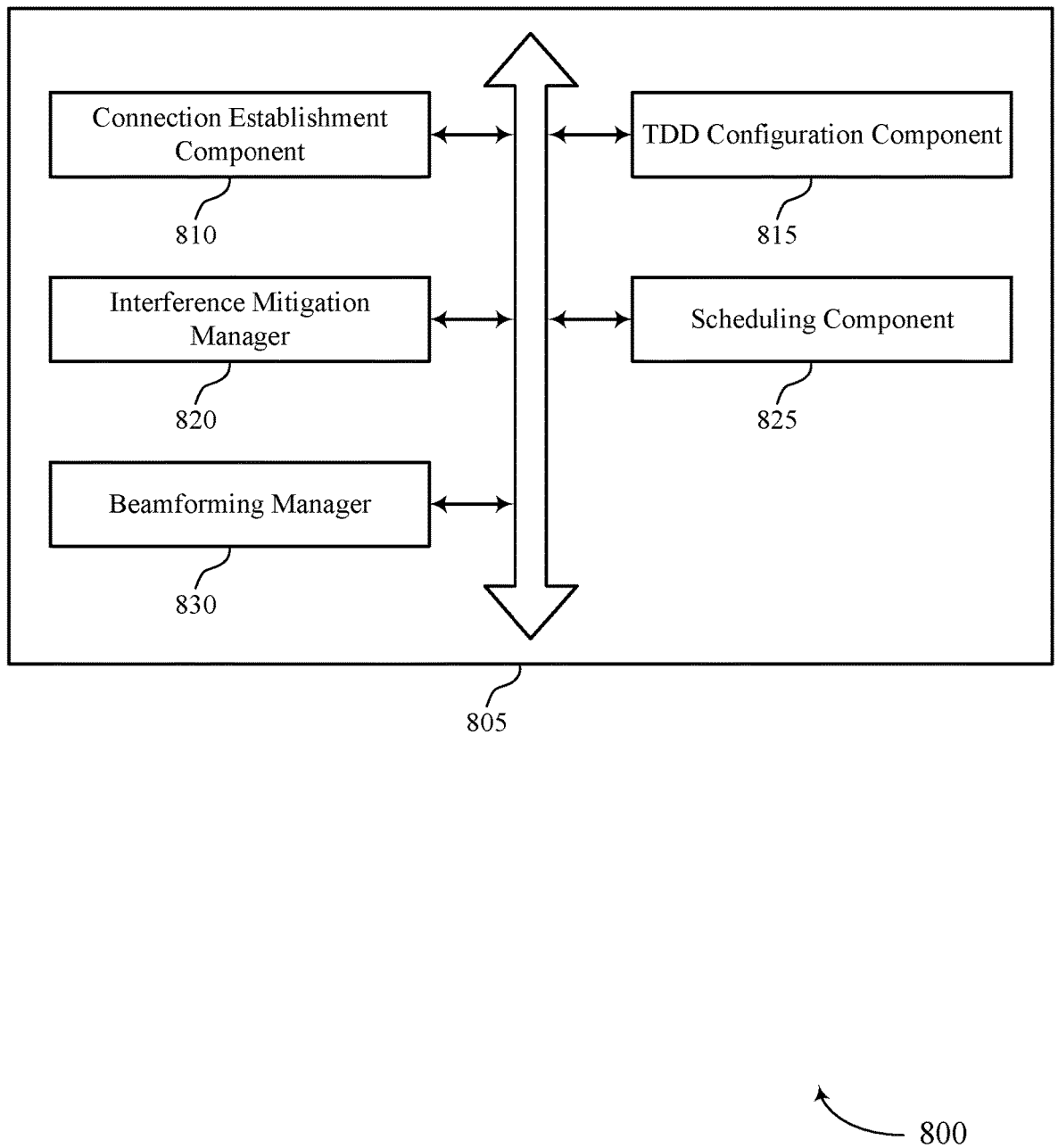
FIG. 8 shows a block diagram of a communications manager that supports asymmetric TDD coexistence techniques in accordance with aspects of the present disclosure.

FIG. 8 shows a block diagram 800 of a communications manager 805 that supports asymmetric TDD coexistence techniques in accordance with aspects of the present disclosure. The communications manager 805 may be an example of aspects of a communications manager 615, a communications manager 715, or a communications manager 910 described herein. The communications manager 805 may include a connection establishment component 810, a TDD configuration component 815, an interference mitigation manager 820, a scheduling component 825, and a beamforming manager 830. Each of these modules may communicate, directly or indirectly, with one another (e.g., via one or more buses).

The connection establishment component 810 may establish at least one wireless connection with at least one UE using TDD in a first frequency band of a set of frequency bands, where the set of frequency bands has an associated baseline TDD configuration. In some examples, the connection establishment component 810 may communicate with the at least one UE using the first TDD configuration and the interference mitigation procedure. In some examples, the connection establishment component 810, before or after communications using the first TDD configuration, may communicate with the at least one UE using the baseline TDD configuration without using interference mitigation procedures.

The TDD configuration component 815 may identify a first TDD configuration that is different than the baseline TDD configuration for communications with the at least one UE. In some examples, the TDD configuration component 815 may select, before or after the communicating using the first TDD configuration, the baseline TDD configuration for communications with the at least one UE. In some cases, a first set of DL slots of the baseline TDD configuration may include a first subset of DL slots that are configurable only as DL slots and a second subset of slots that are flexible slots which may be reconfigured to UL slots based on the selected TDD configuration, and a second set of UL slots of the baseline TDD configuration may include a third subset of UL slots that are configurable only as UL slots and a fourth subset of slots that are flexible slots which may be reconfigured to DL slots based on the selected TDD configuration.

The scheduling component 825, in some examples, may schedule higher priority DL transmissions in the first subset of DL slots, lower priority DL transmissions in the second subset of slots, higher priority UL transmissions in the third subset of UL slots, and lower priority UL transmissions in the fourth subset of slots. In some cases, the higher priority DL transmissions include DL synchronization signals, DL broadcast transmissions, or combinations thereof, and the higher priority UL transmissions include, UL control signals, UL random access channel transmissions, or combinations thereof.

In some cases, the first base station is associated with a first operator of a first wireless communications network and one or more adjacent base stations to the first base station are associated with a second operator of a second wireless communications network, and where the second operator uses a TDD configuration that is different than the first TDD configuration. In some cases, the identifying the first TDD configuration is performed dynamically or semi-statically.

The interference mitigation manager 820 may select an interference mitigation procedure based on the identified first TDD configuration. In some examples, the interference mitigation manager 820 may discontinue the interference mitigation procedure or not select an interference mitigation procedure based on the baseline TDD configuration being selected for communications with the one or more UEs.

In some cases, the baseline TDD configuration includes a first set of DL slots configured for DL transmissions and a second set of uplink (UL) slots configured for UL transmissions, and where the interference mitigation procedure is selected when the identified TDD configuration has one or more DL slots that overlap with the second set of UL slots of the baseline TDD configuration. In some cases, the interference mitigation procedure is not selected when the identified TDD configuration has one or more UL slots that overlap with the first set of DL slots of the baseline TDD configuration, and the identified TDD configuration has one or more DL slots that are non-overlapping with the second set of slots of the baseline TDD configuration.

In some cases, the interference mitigation procedure provides that, for transmissions of the first operator during TDD slots of the first TDD configuration that have a different duplex direction than corresponding TDD slots of the baseline TDD configuration, an interference level at the one or more adjacent base stations or one or more UEs associated with the second operator are below a threshold value. In some cases, the threshold value may be established as a predefined threshold value that provides that the one or more adjacent base station or UEs are able to receive transmissions reliably. In some cases, the threshold value may be a predefined value provided by a government or other entity that regulates the set of frequency bands.

In some cases, the interference mitigation procedure includes one or more of active antenna system (AAS) beamforming of downlink transmission beams, reducing transmit power or power spectral density of downlink transmissions, pulse shaping of downlink transmissions, predistortion filtering, or any combinations thereof.

The beamforming manager 830 may manage, in some examples, AAS beamforming in accordance with full dimension MIMO (FD-MIMO) beamforming techniques (e.g., beamforming that includes beamforming in both a vertical dimension and horizontal dimension).

Figure 9:
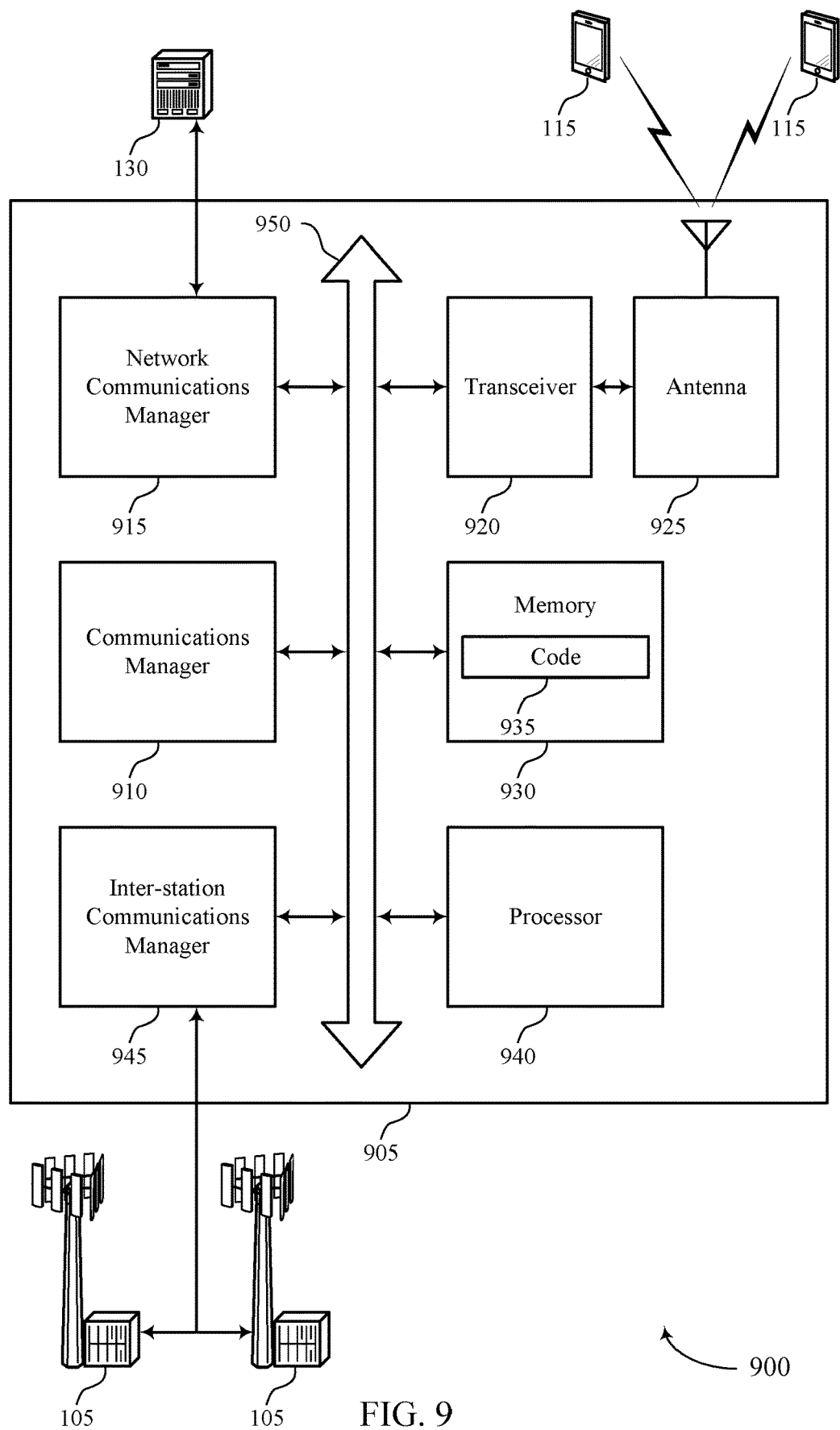
FIG. 9 shows a diagram of a system including a device that supports asymmetric TDD coexistence techniques in accordance with aspects of the present disclosure.

FIG. 9 shows a diagram of a system 900 including a device 905 that supports asymmetric TDD coexistence techniques in accordance with aspects of the present disclosure. The device 905 may be an example of or include the components of device 605, device 705, or a base station 105 as described herein. The device 905 may include components for bi-directional voice and data communications including components for transmitting and receiving communications, including a communications manager 910, a network communications manager 915, a transceiver 920, an antenna 925, memory 930, a processor 940, and an inter-station communications manager 945. These components may be in electronic communication via one or more buses (e.g., bus 950).

The communications manager 910 may establish, at a first base station, at least one wireless connection with at least one UE using TDD in a first frequency band of a set of frequency bands, where the set of frequency bands has an associated baseline TDD configuration, communicate with the at least one UE using the first TDD configuration and the interference mitigation procedure, identify a first TDD configuration that is different than the baseline TDD configuration for communications with the at least one UE, and select an interference mitigation procedure based on the identified first TDD configuration.

The network communications manager 915 may manage communications with the core network (e.g., via one or more wired backhaul links). For example, the network communications manager 915 may manage the transfer of data communications for client devices, such as one or more UEs 115.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some cases, a memory controller may be integrated into processor 940. The processor 940 may be configured to execute computer-readable instructions stored in a memory (e.g., the memory 930) to cause the device #{device} to perform various functions (e.g., functions or tasks supporting asymmetric TDD coexistence techniques).

The inter-station communications manager 945 may manage communications with other base station 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communication network technology to provide communication between base stations 105.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
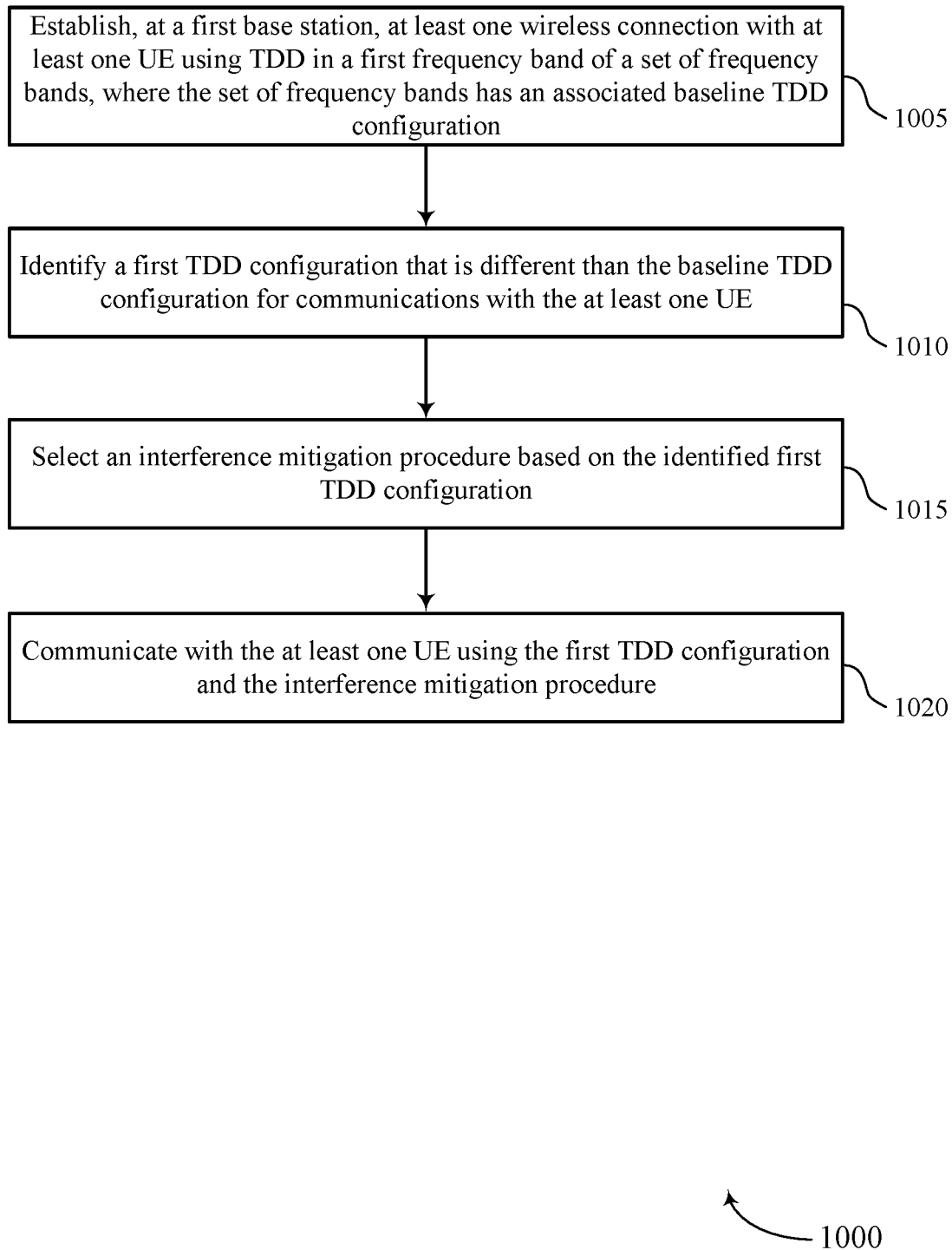
FIGS. 10 and 11 show flowcharts illustrating methods that support asymmetric TDD coexistence techniques in accordance with aspects of the present disclosure.

FIG. 10 shows a flowchart illustrating a method 1000 that supports asymmetric TDD coexistence techniques in accordance with aspects of the present disclosure. The operations of method 1000 may be implemented by a base station 105 or its components as described herein. For example, the operations of method 1000 may be performed by a communications manager as described with reference to FIGS. 6 through 9. In some examples, a base station may execute a set of instructions to control the functional elements of the base station to perform the functions described below. Additionally or alternatively, a base station may perform aspects of the functions described below using special-purpose hardware.

At 1005, the base station may establish at least one wireless connection with at least one UE using TDD in a first frequency band of a set of frequency bands, where the set of frequency bands has an associated baseline TDD configuration. The operations of 1005 may be performed according to the methods described herein. In some examples, aspects of the operations of 1005 may be performed by a connection establishment component as described with reference to FIGS. 6 through 9. In some cases, the first base station is associated with a first operator of a first wireless communications network and one or more adjacent base stations to the first base station are associated with a second operator of a second wireless communications network, and where the second operator uses a TDD configuration that is different than the first TDD configuration.

At 1010, the base station may identify a first TDD configuration that is different than the baseline TDD configuration for communications with the at least one UE. The operations of 1010 may be performed according to the methods described herein. In some examples, aspects of the operations of 1010 may be performed by a TDD configuration component as described with reference to FIGS. 6 through 9. In some cases, the identifying the first TDD configuration is performed dynamically or semi-statically.

At 1015, the base station may select an interference mitigation procedure based on the identified first TDD configuration. The operations of 1015 may be performed according to the methods described herein. In some examples, aspects of the operations of 1015 may be performed by an interference mitigation manager as described with reference to FIGS. 6 through 9. In some cases, the baseline TDD configuration includes a first set of DL slots configured for DL transmissions and a second set of UL slots configured for UL transmissions, and where the interference mitigation procedure is selected only when the identified TDD configuration has one or more DL slots that overlap with the second set of UL slots of the baseline TDD configuration. In some cases, the interference mitigation procedure is not selected when the identified TDD configuration has one or more UL slots that overlap with the first set of DL slots of the baseline TDD configuration, and the identified TDD configuration has one or more DL slots that are non-overlapping with the second set of slots of the baseline TDD configuration. In some cases, the interference mitigation procedure includes one or more of active antenna system (AAS) beamforming of downlink transmission beams, reducing transmit power or power spectral density of downlink transmissions, pulse shaping of downlink transmissions, predistortion filtering, or any combinations thereof.

In some cases, the first set of DL slots includes a first subset of DL slots that are configurable only as DL slots and a second subset of slots that are flexible slots which may be reconfigured to UL slots based on the selected TDD configuration, and where the second set of UL slots includes a third subset of UL slots that are configurable only as UL slots and a fourth subset of slots that are flexible slots which may be reconfigured to DL slots based on the selected TDD configuration. In some cases, the base station may schedule higher priority DL transmissions in the first subset of DL slots, lower priority DL transmissions in the second subset of slots, higher priority UL transmissions in the third subset of UL slots, and lower priority UL transmissions in the fourth subset of slots.

At 1020, the base station may communicate with the at least one UE using the first TDD configuration and the interference mitigation procedure. The operations of 1020 may be performed according to the methods described herein. In some examples, aspects of the operations of 1020 may be performed by a connection establishment component as described with reference to FIGS. 6 through 9.

Figure 11:
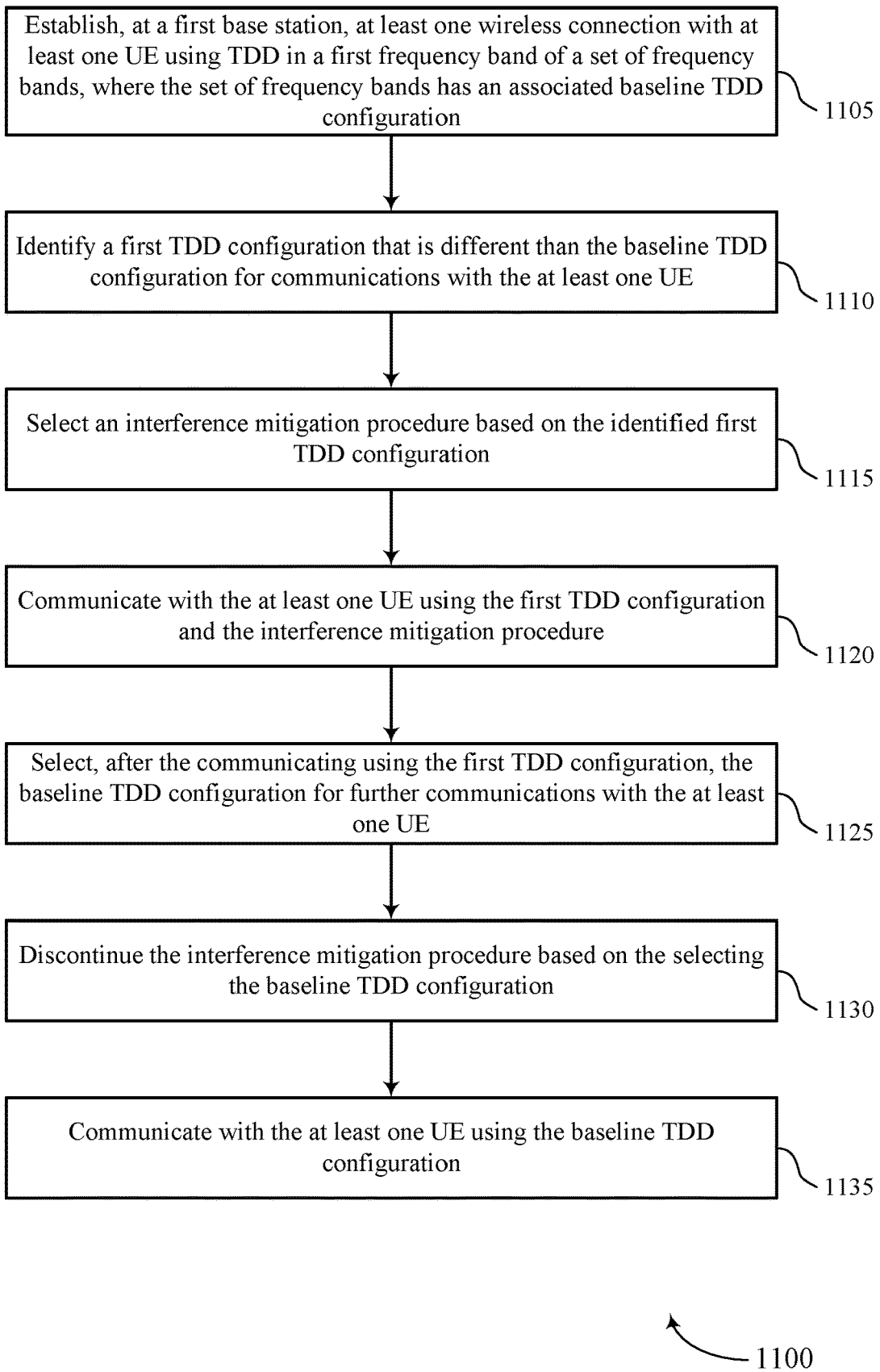

FIG. 11 shows a flowchart illustrating a method 1100 that supports asymmetric TDD coexistence techniques in accordance with aspects of the present disclosure. The operations of method 1100 may be implemented by a base station 105 or its components as described herein. For example, the operations of method 1100 may be performed by a communications manager as described with reference to FIGS. 6 through 9. In some examples, a base station may execute a set of instructions to control the functional elements of the base station to perform the functions described below. Additionally or alternatively, a base station may perform aspects of the functions described below using special-purpose hardware.

At 1105, the base station may establish at least one wireless connection with at least one UE using TDD in a first frequency band of a set of frequency bands, where the set of frequency bands has an associated baseline TDD configuration. The operations of 1105 may be performed according to the methods described herein. In some examples, aspects of the operations of 1105 may be performed by a connection establishment component as described with reference to FIGS. 6 through 9.

At 1110, the base station may identify a first TDD configuration that is different than the baseline TDD configuration for communications with the at least one UE. The operations of 1110 may be performed according to the methods described herein. In some examples, aspects of the operations of 1110 may be performed by a TDD configuration component as described with reference to FIGS. 6 through 9.

At 1115, the base station may select an interference mitigation procedure based on the identified first TDD configuration. The operations of 1115 may be performed according to the methods described herein. In some examples, aspects of the operations of 1115 may be performed by an interference mitigation manager as described with reference to FIGS. 6 through 9.

At 1120, the base station may communicate with the at least one UE using the first TDD configuration and the interference mitigation procedure. The operations of 1120 may be performed according to the methods described herein. In some examples, aspects of the operations of 1120 may be performed by a connection establishment component as described with reference to FIGS. 6 through 9.

At 1125, the base station may select, after the communicating using the first TDD configuration, the baseline TDD configuration for further communications with the at least one UE. The operations of 1125 may be performed according to the methods described herein. In some examples, aspects of the operations of 1125 may be performed by a TDD configuration component as described with reference to FIGS. 6 through 9.

At 1130, the base station may discontinue the interference mitigation procedure based on the selecting the baseline TDD configuration. The operations of 1130 may be performed according to the methods described herein. In some examples, aspects of the operations of 1130 may be performed by an interference mitigation manager as described with reference to FIGS. 6 through 9.

At 1135, the base station may communicate with the at least one UE using the baseline TDD configuration. The operations of 1135 may be performed according to the methods described herein. In some examples, aspects of the operations of 1135 may be performed by a connection establishment component as described with reference to FIGS. 6 through 9.

It should be noted that the methods described above describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication, comprising: establishing, at a first base station, at least one wireless connection with at least one UE using TDD in a first frequency band of a set of frequency bands, wherein the set of frequency bands has an associated baseline TDD configuration; identifying a first TDD configuration that is different than the baseline TDD configuration for communications with the at least one UE; selecting an interference mitigation procedure based at least in part on the identified first TDD configuration; and communicating with the at least one UE using the first TDD configuration and the interference mitigation procedure.

Aspect 2: The method of aspect 1, wherein the baseline TDD configuration comprises a first set of DL slots configured for DL transmissions and a second set of uplink (UL) slots configured for UL transmissions, and the interference mitigation procedure is selected only when the identified TDD configuration has one or more DL slots that overlap with the second set of UL slots of the baseline TDD configuration.

Aspect 3: The method of aspect 2, wherein the interference mitigation procedure is not selected when the identified TDD configuration has one or more UL slots that overlap with the first set of DL slots of the baseline TDD configuration, and the identified TDD configuration has one or more DL slots that are non-overlapping with the second set of slots of the baseline TDD configuration.

Aspect 4: The method of any of aspects 2 through 3, wherein the first set of DL slots includes a first subset of DL slots that are configurable only as DL slots and a second subset of slots that are flexible slots which may be reconfigured to UL slots based on the selected TDD configuration, and the second set of UL slots includes a third subset of UL slots that are configurable only as UL slots and a fourth subset of slots that are flexible slots which may be reconfigured to DL slots based on the selected TDD configuration.

Aspect 5: The method of aspect 4, further comprising: scheduling higher priority DL transmissions in the first subset of DL slots, lower priority DL transmissions in the second subset of slots, higher priority UL transmissions in the third subset of UL slots, and lower priority UL transmissions in the fourth subset of slots.

Aspect 6: The method of aspect 5, wherein the higher priority DL transmissions include DL synchronization signals, DL broadcast transmissions, or combinations thereof, and the higher priority UL transmissions include, UL control signals, UL random access channel transmissions, or combinations thereof.

Aspect 7: The method of any of aspects 1 through 6, further comprising: selecting, after the communicating using the first TDD configuration, the baseline TDD configuration for further communications with the at least one UE; discontinuing the interference mitigation procedure based at least in part on the selecting the baseline TDD configuration; and communicating with the at least one UE using the baseline TDD configuration.

Aspect 8: The method of any of aspects 1 through 7, wherein the first base station is associated with a first operator of a first wireless communications network and one or more adjacent base stations to the first base station are associated with a second operator of a second wireless communications network, and the second operator uses a TDD configuration that is different than the first TDD configuration.

Aspect 9: The method of aspect 8, wherein the interference mitigation procedure provides that, for transmissions of the first operator during TDD slots of the first TDD configuration that have a different duplex direction than corresponding TDD slots of the baseline TDD configuration, an interference level at the one or more adjacent base stations or one or more UEs associated with the second operator are below a threshold value.

Aspect 10: The method of any of aspects 1 through 9, wherein the interference mitigation procedure comprises one or more of active antenna system (AAS) beamforming of downlink transmission beams, reducing transmit power or power spectral density of downlink transmissions, pulse shaping of downlink transmissions, predistortion filtering, or any combinations thereof.

Aspect 11: The method of any of aspects 1 through 10, wherein the identifying the first TDD configuration is performed dynamically or semi-statically.

Aspect 12: An apparatus for wireless communication, comprising a processor; memory coupled with the processor; and instructions stored in the memory and executable by the processor to cause the apparatus to perform a method of any of aspects 1 through 11.

Aspect 13: An apparatus for wireless communication, comprising at least one means for performing a method of any of aspects 1 through 11.

Aspect 14: A non-transitory computer-readable medium storing code for wireless communication, the code comprising instructions executable by a processor to perform a method of any of aspects 1 through 11.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   establishing, at a first access network entity, at least one wireless connection with at least one user equipment (UE) using time division duplexing (TDD) in a first frequency band of a set of frequency bands, wherein the set of frequency bands has an associated baseline TDD configuration;
   identifying, at the first access network entity based at least in part on an amount of data for communication between the first access network entity and the at least one UE, a first TDD configuration that is different than the baseline TDD configuration for communications between the first access network entity and the at least one UE, wherein a slot configured for uplink (UL) in the baseline TDD configuration is reconfigured for downlink (DL) in the first TDD configuration, and wherein the baseline TDD configuration comprises a first set of DL slots configured for DL transmissions and a second set of UL slots configured for UL transmissions;
   selecting, at the first access network entity, an interference mitigation procedure based at least in part on the first TDD configuration comprising the slot reconfigured for DL, wherein the interference mitigation procedure is selected only when the first TDD configuration has one or more DL slots that overlap with the second set of UL slots of the baseline TDD configuration; and
   performing beamforming for a DL transmission from the first access network entity to the at least one UE in the slot of the first TDD configuration reconfigured for DL based at least in part on the interference mitigation procedure;
   wherein the first access network entity is associated with a first operator of a first wireless communications network and one or more adjacent access network entities adjacent to the first access network entity are associated with a second operator of a second wireless communications network, and wherein the second operator uses a second TDD configuration comprising a first set of TDD slots that is different than a second set of TDD slots of the first TDD configuration;
   wherein the interference mitigation procedure provides that, for transmissions of the first operator during one or more TDD slots of the second set of TDD slots of the first TDD configuration that have a different duplex direction than corresponding TDD slots of the baseline TDD configuration, an interference level at the one or more adjacent access network entities or one or more UEs associated with the second operator are below a threshold value.

2. The method of claim 1, wherein the interference mitigation procedure is not selected when the first TDD configuration has one or more UL slots that overlap with the first set of DL slots of the baseline TDD configuration, and the first TDD configuration has one or more DL slots that are non-overlapping with the second set of UL slots of the baseline TDD configuration.

3. The method of claim 1, wherein the first set of DL slots includes a first subset of DL slots that are configurable only as DL slots and a second subset of slots that are flexible slots which may be reconfigured to UL slots based on a selected TDD configuration, and wherein the second set of UL slots includes a third subset of UL slots that are configurable only as UL slots and a fourth subset of slots that are flexible slots which may be reconfigured to DL slots based on the selected TDD configuration.

4. The method of claim 3, further comprising:
scheduling higher priority DL transmissions in the first subset of DL slots, lower priority DL transmissions in the second subset of slots, higher priority UL transmissions in the third subset of UL slots, and lower priority UL transmissions in the fourth subset of slots.

5. The method of claim 4, wherein the higher priority DL transmissions include DL synchronization signals, DL broadcast transmissions, or combinations thereof, and the higher priority UL transmissions include, UL control signals, UL random access channel transmissions, or combinations thereof.

6. The method of claim 1, further comprising:
selecting, after the communicating using the first TDD configuration, the baseline TDD configuration for further communications with the at least one UE;
discontinuing the interference mitigation procedure based at least in part on the selecting the baseline TDD configuration; and
communicating with the at least one UE using the baseline TDD configuration.

7. The method of claim 1, wherein the interference mitigation procedure comprises one or more of active antenna system (AAS) beamforming of downlink transmission beams, and one or more of reducing transmit power or power spectral density of downlink transmissions, pulse shaping of downlink transmissions, predistortion filtering, or any combinations thereof.

8. The method of claim 1, wherein the identifying the first TDD configuration is performed dynamically or semi-statically.

9. The method of claim 1, wherein the interference mitigation procedure comprises at least active antenna system (AAS) beamforming of downlink transmission beams.

10. An apparatus for wireless communication, comprising:
a processor,
memory in electronic communication with the processor; and
instructions stored in the memory and executable by the processor to cause the apparatus to:
establish, at a first access network entity, at least one wireless connection with at least one user equipment (UE) using time division duplexing (TDD) in a first frequency band of a set of frequency bands, wherein the set of frequency bands has an associated baseline TDD configuration;
identify, at the first access network entity based at least in part on an amount of data for communication between the first access network entity and the at least one UE, a first TDD configuration that is different than the baseline TDD configuration for communications between the first access network entity and the at least one UE,
wherein a slot configured for uplink (UL) in the baseline TDD configuration is reconfigured for downlink (DL) in the first TDD configuration, and wherein the baseline TDD configuration comprises a first set of DL slots configured for DL transmissions and a second set of UL slots configured for UL transmissions;
select, at the first access network entity, an interference mitigation procedure based at least in part on the first TDD configuration comprising the slot reconfigured for DL, wherein the interference mitigation procedure is selected only when the first TDD configuration has one or more DL slots that overlap with the second set of UL slots of the baseline TDD configuration; and
perform beamforming for a DL transmission from the first access network entity to the at least one UE in the slot of the first TDD configuration reconfigured for DL based at least in part on the interference mitigation procedure;
wherein the first access network entity is associated with a first operator of a first wireless communications network and one or more adjacent access network entities adjacent to the first access network entity are associated with a second operator of a second wireless communications network, and wherein the second operator uses a second TDD configuration comprising a first set of TDD slots that is different than a second set of TDD slots of the first TDD configuration;
wherein the interference mitigation procedure provides that, for transmissions of the first operator during one or more TDD slots of the second set of TDD slots of the first TDD configuration that have a different duplex direction than corresponding TDD slots of the baseline TDD configuration, an interference level at the one or more adjacent access network entities or one or more UEs associated with the second operator are below a threshold value.

11. The apparatus of claim 10, wherein the interference mitigation procedure is not selected when the first TDD configuration has one or more UL slots that overlap with the first set of DL slots of the baseline TDD configuration, and the first TDD configuration has one or more DL slots that are non-overlapping with the second set of UL slots of the baseline TDD configuration.

12. The apparatus of claim 10, wherein the first set of DL slots includes a first subset of DL slots that are configurable only as DL slots and a second subset of slots that are flexible slots which may be reconfigured to UL slots based on a selected TDD configuration, and wherein the second set of UL slots includes a third subset of UL slots that are configurable only as UL slots and a fourth subset of slots that are flexible slots which may be reconfigured to DL slots based on a selected TDD configuration.

13. The apparatus of claim 12, wherein the instructions are further executable by the processor to cause the apparatus to:
schedule higher priority DL transmissions in the first subset of DL slots, lower priority DL transmissions in the second subset of slots, higher priority UL transmissions in the third subset of UL slots, and lower priority UL transmissions in the fourth subset of slots.

14. The apparatus of claim 13, wherein the higher priority DL transmissions include DL synchronization signals, DL broadcast transmissions, or combinations thereof, and the higher priority UL transmissions include, UL control signals, UL random access channel transmissions, or combinations thereof.

15. The apparatus of claim 10, wherein the instructions are further executable by the processor to cause the apparatus to:
select, after communicating using the first TDD configuration, the baseline TDD configuration for further communications with the at least one UE;
discontinue the interference mitigation procedure based at least in part on the selection of the baseline TDD configuration; and communicate with the at least one UE using the baseline TDD configuration.

16. The apparatus of claim 10, wherein the interference mitigation procedure comprises one or more of active antenna system (AAS) beamforming of downlink transmission beams, and one or more of reducing transmit power or power spectral density of downlink transmissions, pulse shaping of downlink transmissions, predistortion filtering, or any combinations thereof.

17. The apparatus of claim 10, wherein the identification of the first TDD configuration is performed dynamically or semi-statically.

18. The apparatus of claim 10, wherein the interference mitigation procedure comprises at least active antenna system (AAS) beamforming of downlink transmission beams.

19. An apparatus for wireless communication, comprising:
  means for establishing, at a first access network entity, at least one wireless connection with at least one user equipment (UE) using time division duplexing (TDD) in a first frequency band of a set of frequency bands, wherein the set of frequency bands has an associated baseline TDD configuration;
  means for identifying, at the first access network entity based at least in part on an amount of data for communication between the first access network entity and the at least one UE, a first TDD configuration that is different than the baseline TDD configuration for communications between the first access network entity and the at least one UE, wherein a slot configured for uplink (UL) in the baseline TDD configuration is reconfigured for downlink (DL) in the first TDD configuration, and wherein the baseline TDD configuration comprises a first set of DL slots configured for DL transmissions and a second set of UL slots configured for UL transmissions;
  means for selecting, at the first access network entity, an interference mitigation procedure based at least in part on the first TDD configuration comprising the slot reconfigured for DL, wherein the interference mitigation procedure is selected only when the first TDD configuration has one or more DL slots that overlap with the second set of UL slots of the baseline TDD configuration; and
  means for performing beamforming for a DL transmission from the first access network entity to the at least one UE in the slot of the first TDD configuration reconfigured for DL based at least in part on the interference mitigation procedure;
  wherein the first access network entity is associated with a first operator of a first wireless communications network and one or more adjacent access network entities adjacent to the first access network entity are associated with a second operator of a second wireless communications network, and wherein the second operator uses a second TDD configuration comprising a first set of TDD slots that is different than a second set of TDD slots of the first TDD configuration;
  wherein the interference mitigation procedure provides that, for transmissions of the first operator during one or more TDD slots of the second set of TDD slots of the first TDD configuration that have a different duplex direction than corresponding TDD slots of the baseline TDD configuration, an interference level at the one or more adjacent access network entities or one or more UEs associated with the second operator are below a threshold value.

20. The apparatus of claim 19, further comprising:
  means for selecting, after the communicating using the first TDD configuration, the baseline TDD configuration for further communications with the at least one UE;
  means for discontinuing the interference mitigation procedure based at least in part on the selecting the baseline TDD configuration; and
  means for communicating with the at least one UE using the baseline TDD configuration.

21. The apparatus of claim 19, wherein the interference mitigation procedure comprises at least active antenna system (AAS) beamforming of downlink transmission beams.

22. A non-transitory computer-readable medium storing code for wireless communication, the code comprising instructions executable by a processor to:
  establish, at a first access network entity, at least one wireless connection with at least one user equipment (UE) using time division duplexing (TDD) in a first frequency band of a set of frequency bands, wherein the set of frequency bands has an associated baseline TDD configuration;
  identify, at the first access network entity based at least in part on an amount of data for communication between the first access network entity and the at least one UE, a first TDD configuration that is different than the baseline TDD configuration for communications between the first access network entity and the at least one UE, wherein a slot configured for uplink (UL) in the baseline TDD configuration is reconfigured for downlink (DL) in the first TDD configuration, and wherein the baseline TDD configuration comprises a first set of DL slots configured for DL transmissions and a second set of UL slots configured for UL transmissions;
  select, at the first access network entity, an interference mitigation procedure based at least in part on the first TDD configuration comprising the slot reconfigured for DL, wherein the interference mitigation procedure is selected only when the first TDD configuration has one or more DL slots that overlap with the second set of UL slots of the baseline TDD configuration; and
  perform beamforming for a DL transmission from the first access network entity to the at least one UE in the slot of the first TDD configuration reconfigured for DL based at least in part on the interference mitigation procedure;
  wherein the first access network entity is associated with a first operator of a first wireless communications network and one or more adjacent access network entities adjacent to the first access network entity are associated with a second operator of a second wireless communications network, and wherein the second operator uses a second TDD configuration comprising a first set of TDD slots that is different than a second set of TDD slots of the first TDD configuration;
  wherein the interference mitigation procedure provides that, for transmissions of the first operator during one or more TDD slots of the second set of TDD slots of the first TDD configuration that have a different duplex direction than corresponding TDD slots of the baseline TDD configuration, an interference level at the one or more adjacent access network entities or one or more UEs associated with the second operator are below a threshold value.

23. The non-transitory computer-readable medium of claim 22, wherein the baseline TDD configuration comprises a first set of downlink (DL) slots configured for DL transmissions and a second set of uplink (UL) slots configured for UL transmissions, and wherein the interference mitigation procedure is selected only when the first TDD configuration has one or more DL slots that overlap with the second set of UL slots of the baseline TDD configuration.

24. The non-transitory computer-readable medium of claim 22, wherein the instructions are further executable by the processor to:
    select, after communicating using the first TDD configuration, the baseline TDD configuration for further communications with the at least one UE;
    discontinue the interference mitigation procedure based at least in part on the selection of the baseline TDD configuration; and
    communicate with the at least one UE using the baseline TDD configuration.

25. The non-transitory computer-readable medium of claim 22, wherein the interference mitigation procedure comprises at least active antenna system (AAS) beamforming of downlink transmission beams.

* * * * *